(12) United States Patent
Corazza

(10) Patent No.: US 12,065,298 B2
(45) Date of Patent: Aug. 20, 2024

(54) ECO-SUSTAINABLE CONTAINER

(71) Applicant: Fameccanica.Data S.p.A., San Giovanni Teatino (IT)

(72) Inventor: Federico Corazza, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 0 days.

(21) Appl. No.: 17/702,994

(22) Filed: Mar. 24, 2022

(65) Prior Publication Data
US 2022/0315308 A1 Oct. 6, 2022

(30) Foreign Application Priority Data

Mar. 30, 2021 (EP) .................................... 21165789

(51) Int. Cl.
| | | |
|---|---|---|
| *B65D 77/06* | (2006.01) | |
| *B65D 1/02* | (2006.01) | |
| *B65D 23/00* | (2006.01) | |
| *B65D 25/30* | (2006.01) | |
| *B65D 77/30* | (2006.01) | |

(52) U.S. Cl.
CPC ............. *B65D 77/06* (2013.01); *B65D 25/30* (2013.01); *B65D 77/062* (2013.01); *B65D 77/068* (2013.01); *B65D 77/30* (2013.01); *Y02W 90/10* (2015.05)

(58) Field of Classification Search
CPC ........ B65D 77/06; B65D 25/30; B65D 77/30; B65D 77/068; B65D 77/062; Y02W 90/10
See application file for complete search history.

(56) References Cited

U.S. PATENT DOCUMENTS

| | | | | |
|---|---|---|---|---|
| 3,206,075 A | * | 9/1965 | Scholle ................. | B67D 3/045 222/105 |
| 3,297,226 A | | 1/1967 | Scholle | |
| 3,642,172 A | * | 2/1972 | Malpas ................. | B65D 88/54 222/90 |
| 4,314,654 A | * | 2/1982 | Gaubert ............... | B65D 77/067 222/536 |
| 4,322,018 A | * | 3/1982 | Rutter ................... | B67B 7/26 222/105 |
| 4,416,395 A | * | 11/1983 | Gaubert ................ | B67D 3/043 222/536 |
| 4,562,940 A | * | 1/1986 | Asphar ................. | B65D 83/06 222/88 |

(Continued)

FOREIGN PATENT DOCUMENTS

| | | |
|---|---|---|
| EP | 0598255 A2 | 5/1994 |
| EP | 1228979 A1 | 8/2002 |
| WO | 2015126883 A1 | 8/2015 |

OTHER PUBLICATIONS

European Search Report dated Sep. 10, 2021. 11 pages.

*Primary Examiner* — Frederick C Nicolas
(74) *Attorney, Agent, or Firm* — RMCK Law Group PLC

(57) ABSTRACT

Disclosed is an eco-sustainable container for fluid products that includes an outer shell made of cellulose-based material and having an inner surface and at least one through opening having an inner edge; and at least one sealed flexible bag of plastic material containing a fluid product. The sealed flexible bag can be accessed through piercing, and the entire container can be disposed of and recycled as a plastic, compost, or paper material, being accordingly highly environment-friendly.

14 Claims, 5 Drawing Sheets

(56) References Cited

U.S. PATENT DOCUMENTS

| | | | | |
|---|---|---|---|---|
| 5,102,010 | A * | 4/1992 | Osgar | B65D 47/36 |
| | | | | 222/541.9 |
| 5,111,970 | A * | 5/1992 | Rutter | B67D 3/047 |
| | | | | 222/105 |
| 5,141,134 | A * | 8/1992 | Machado | A47G 23/0258 |
| | | | | 222/105 |
| 5,433,345 | A * | 7/1995 | Sasaki | B65D 83/0055 |
| | | | | 222/105 |
| 7,188,749 | B2 * | 3/2007 | Miller | B65D 77/06 |
| | | | | 222/105 |
| 8,353,428 | B2 * | 1/2013 | Pritchard | B67D 3/0045 |
| | | | | 222/105 |
| 10,717,574 | B2 * | 7/2020 | Gualandi | B65D 65/463 |
| 2007/0110928 | A1 * | 5/2007 | Bried | B65D 25/14 |
| | | | | 493/51 |
| 2009/0283541 | A1 * | 11/2009 | Compton | B65D 77/068 |
| | | | | 222/105 |
| 2015/0197376 | A1 * | 7/2015 | Curtin | B65D 33/02 |
| | | | | 220/9.4 |
| 2017/0066568 | A1 * | 3/2017 | Stever | B65D 77/068 |
| 2017/0225862 | A1 * | 8/2017 | Schnabel | B65D 25/54 |
| 2017/0334623 | A1 * | 11/2017 | Gualandi | B65B 29/022 |

* cited by examiner

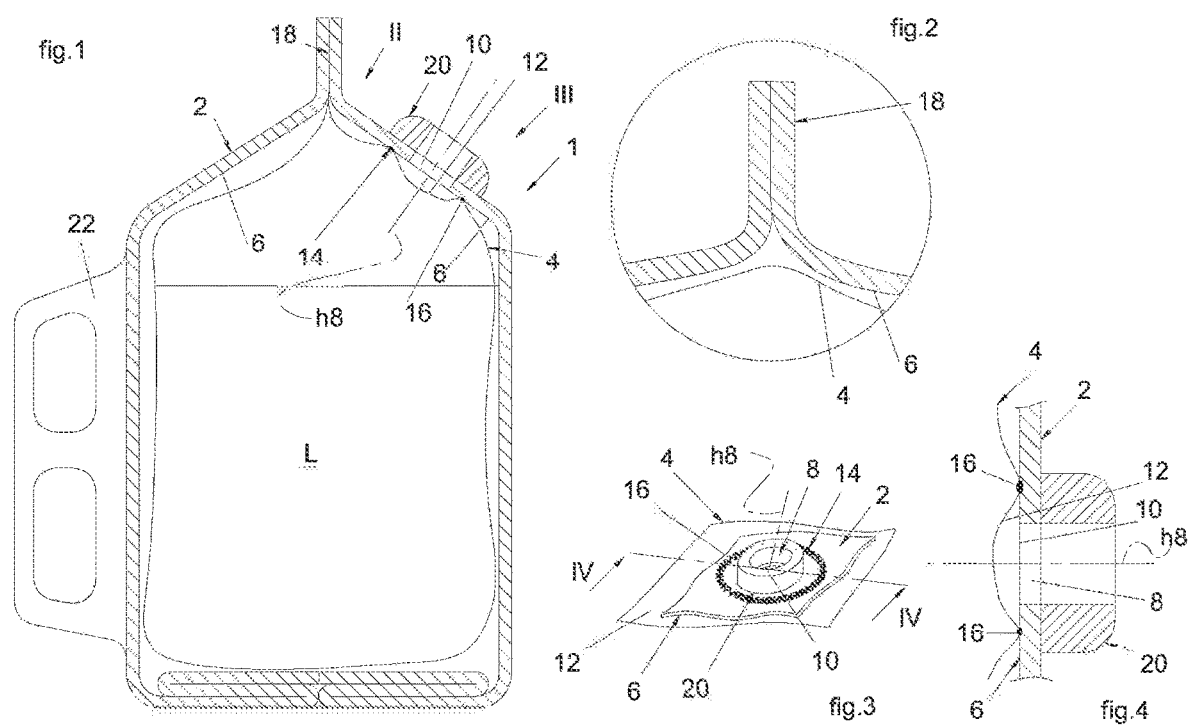

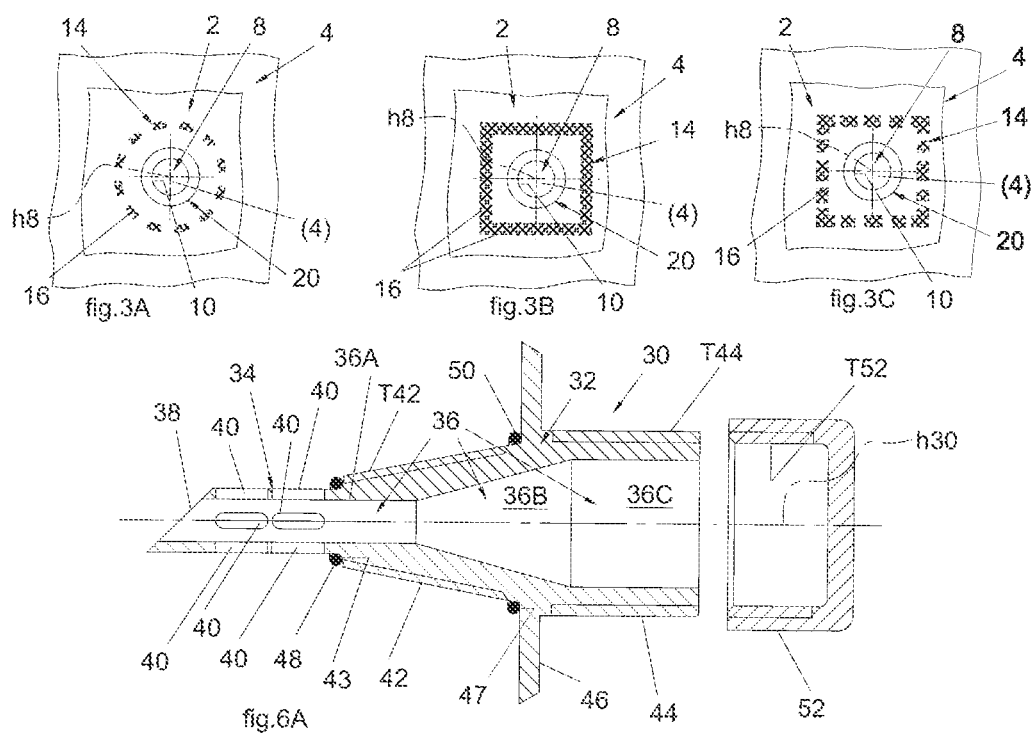

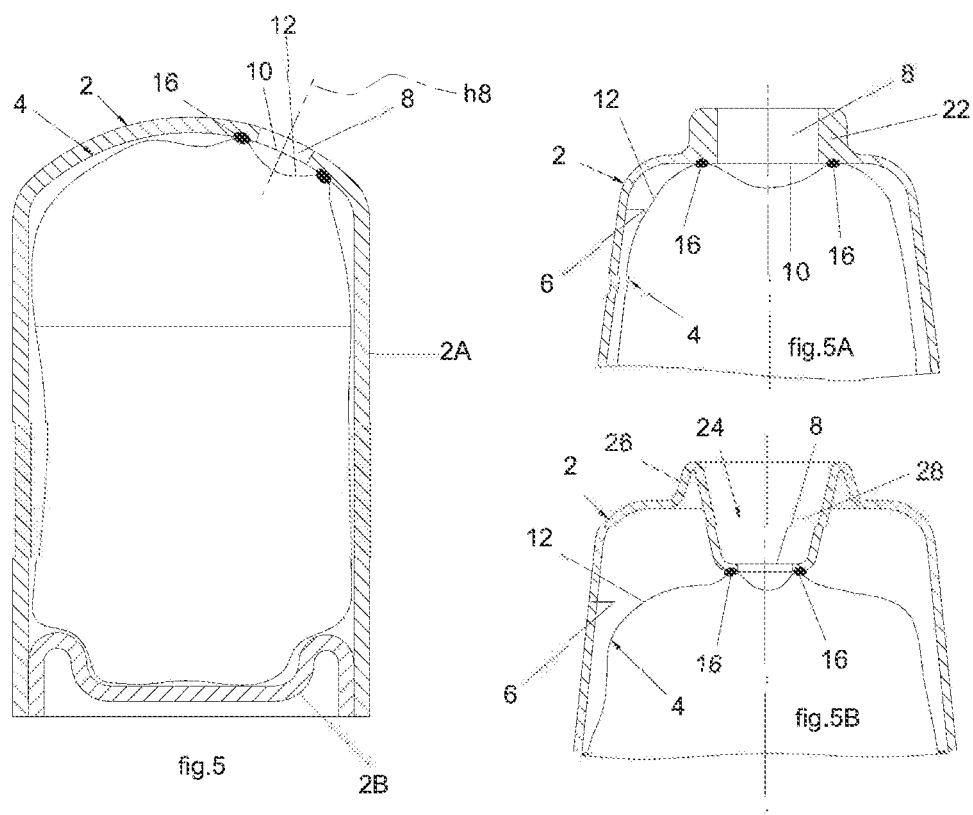

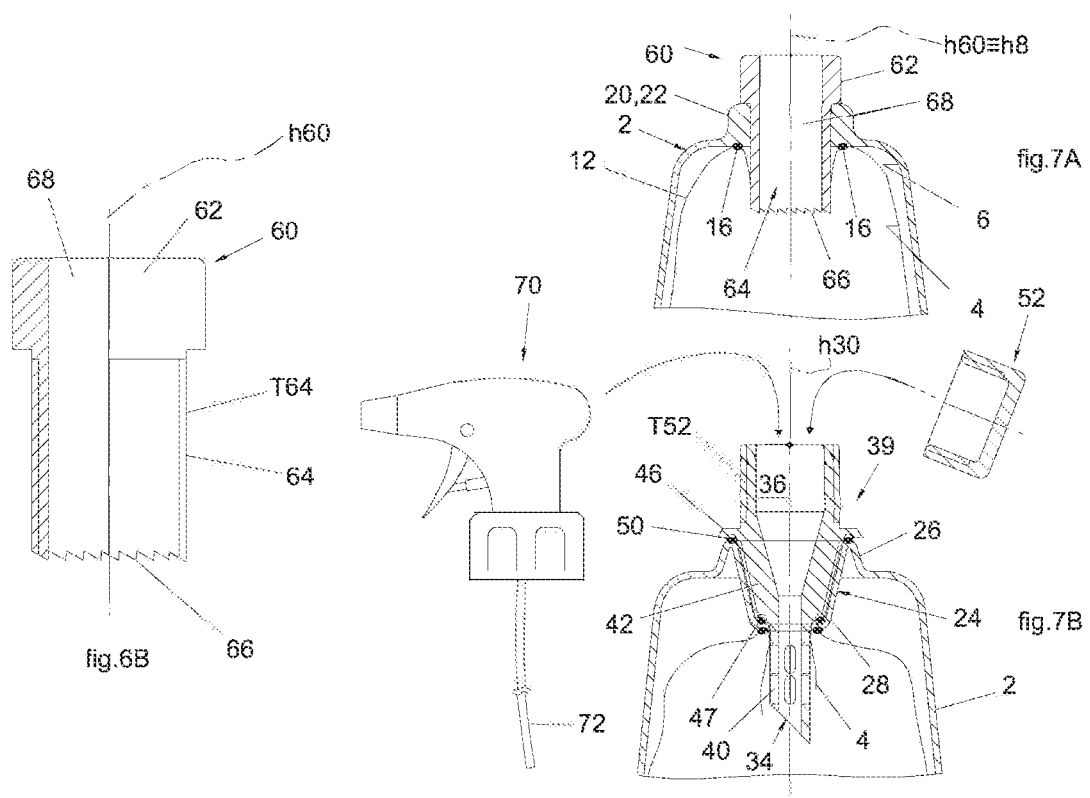

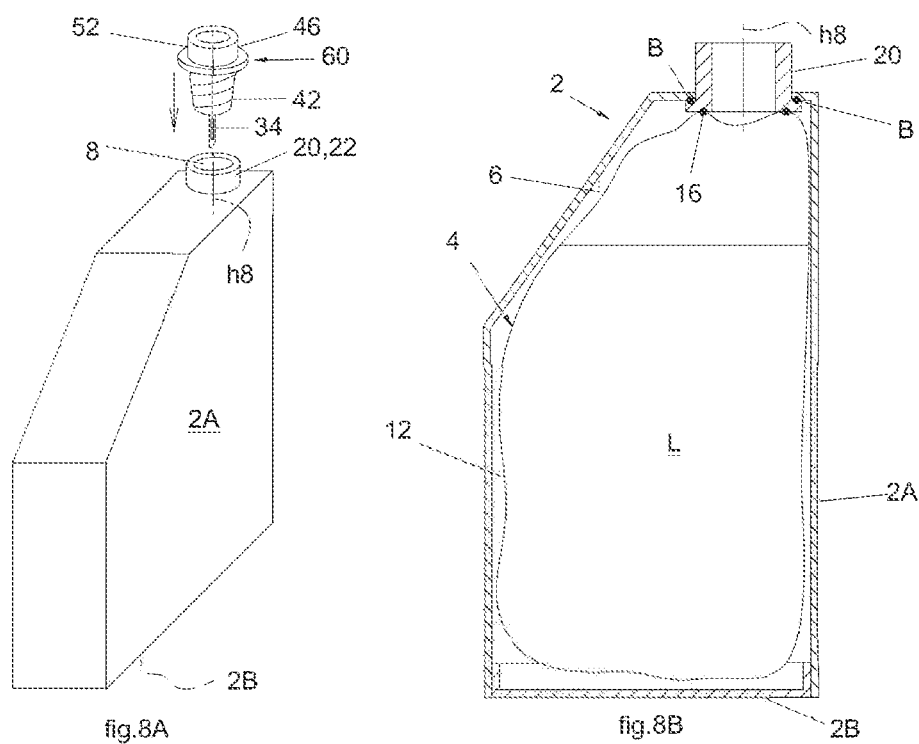

ECO-SUSTAINABLE CONTAINER

CROSS-REFERENCE TO RELATED APPLICATION

This application claims priority to European Patent Application No. 21165789.5 filed Mar. 30, 2021. The disclosure of the above application is incorporated herein by reference in its entirety.

FIELD OF THE INVENTION

The present invention relates to eco-sustainable containers, particularly containers for non-food liquid products, such as detergents or the like.

PRIOR ART

In current packaging technology, most of the disposable containers used for non-food pourable liquids are based on plastic. Such solutions integrate a number of product functions in an indivisible body. These one-piece solutions provide product enclosing, a structure to allow the container to stand upright and guarantee package integrity, and a neck to enable product pouring.

Such containers are usually completed by a cap, removable or partially removable, which is configured to seal and—in certain cases—to dose the liquid. Other disposable devices may be used as alternatives to caps, such as trigger pumps or spray pumps.

Common examples of disposable containers include rigid plastic bottles and containers whose body consists in flexible (supple) packaging material. The latter usually features a welded monolithic neck. Flexible packaging solutions are more advantageous than rigid plastic solutions in terms of material optimization.

Some recently introduced solutions use a material other than plastic to provide the structural function, in order to reduce the amount of non-sustainable material within the package. Such solutions feature a plastic internal blow-molded bottle-like container, consisting in a neck and in a very thin supple bag, enclosed in an external structural shell made of paper pulp. Plastic caps, trigger or spray pumps complete the solution.

One of the key goals nowadays is to reach a sustainable use of resources, in particular with respect to packaging solutions. Although plastic containers can be recycled when designed as mono-material solutions, in common practice only 80% of such material can actually be recycled.

Moreover, the worldwide average recycling rate for plastics in 2019 was only 8%, thus making plastics a non-desirable material from a sustainability perspective. The use of plastics should therefore be minimized.

All of the known solutions are, however, far from minimizing the amount of plastics when it comes down to providing the functions and features expected from the packaging.

Among these known solutions, the features of which are listed below, are:

i) Rigid packaging: plastic is necessarily used to enclose the liquid product, and unnecessarily used to give structural properties to the package and for the neck; plastic is also unnecessarily used for the possible pump dispenser, which is also considered as disposable.

ii) Flexible packaging: plastic is necessarily used to enclose the liquid product, but otherwise unnecessarily used to give structural properties to the package and for the neck.

iii) Rigid packaging in more recent solutions: plastic is necessarily used to enclose the liquid product and wood pulp is used to give structural properties to the package, while plastic is unnecessarily used for the neck and for the possible pump, which is also considered as disposable.

In summary, all of the unnecessary use of plastics represent a sustainability problem.

OBJECT OF THE INVENTION

The object of the present invention is to solve the aforementioned technical problems. Particularly, the object of the invention is to provide an eco-sustainable container with a reduced environmental impact, which is also fully recyclable.

SUMMARY OF THE INVENTION

The object of the invention is achieved by a container having the features of the appended claims, which form an integral part of the technical disclosure provided herein in relation to the invention.

BRIEF DESCRIPTION OF THE FIGURES

Further features and advantages of the invention will become apparent from the following description with reference to the annexed figures, provided purely by way of non-limiting example, wherein:

FIG. 1 is a sectional view of a container according to embodiments of the invention, FIG. 2 is an enlarged view according to pointer II in FIG. 1, showing a variant, FIG. 3 is a partial perspective view according to pointer III in FIG. 1, FIGS. 3A-3C are similar to FIG. 3, but show alternative configurations, FIG. 4 is a sectional view according to line IV-IV of FIG. 3, FIGS. 5, 5A, 5B show further embodiments of the container according to the invention, FIGS. 6A, 6B show different embodiments of a fluid delivery port according to the invention, FIGS. 7A and 7B show the interaction between the container and the fluid delivery port according to embodiments of the invention, and FIGS. 8A and 8B show yet further embodiments of the container according to the invention.

DETAILED DESCRIPTION

Reference number 1 in FIG. 1 designates as a whole an eco-sustainable container for fluid products according to the invention.

The container 1 comprises an outer shell 2 made of a cellulose-based material, and a sealed flexible bag 4 of polymer material containing a fluid, particularly liquid, product L.

Cellulose based materials that can be used for the outer shell 2 include cellulose pulp and wood pulp, while the polymer material used for the sealed flexible bag 4 is a polymer mono-material, preferably a single polymer mono-material layer. To this end, the polymer mono-material may conveniently be chosen from among the following conventional plastic materials such as PE or drop-in plastic materials such as bio-PE; such materials can be disposed of as plastic materials and recycled as mono-materials.

Compostable plastic materials, for which end-of-life disposal options include a) disposal as paper materials (together with the outer shell 2); b) natural degradation as compost (possibly together with the outer shell 2); c) recycled as compostable plastic materials themselves.

PVA (Polyvinyl Alcohol) film, the same used as a shell material in Single Unit Dose (SUD) products, which is designed to be water soluble above 60° C., whereby the outer shell can be disposed of (and recycled) as paper material, while the flexible bag 4 can be simply dissolved.

Yet preferably, the material of the outer shell 2 is plastic-free, i.e. it does not include plastic materials, neither as a dispersion, nor as layers. In this latter regard, the liquid barrier is entirely provided by the sealed flexible bag 4, without requiring any additional barrier layer on the outer shell 2.

The outer shell 2 comprises an inner surface 6 and a through opening 8 (preferably circular and having an axis h8) featuring an inner edge 10. The sealed flexible bag 4 is housed within the outer shell 2 and has an outer surface 12 facing the inner surface 6 of the outer shell 2.

According to the invention, with reference to FIGS. 1 and 3, a portion of the outer surface 12 of the sealed flexible bag 4 is joined to a portion of the inner surface 6 of the outer shell 2 along a joining path 14 surrounding the inner edge 10, particularly extending around the axis h8 of the opening 8. The portion of the outer surface 12 enclosed by the joining path 14 is configured to be pierced to enable transfer of fluid to and from the bag 4 through the opening 8. According to the invention, as will be detailed in the following, a preferred way to break the bag 4 open comprises piercing the same at the through opening 8 by means of a fluid delivery port.

In this regard, the invention also envisages "clustered" embodiments wherein more than one sealed flexible bag 4 is housed within the outer shell 2. Particularly, when multiple sealed bags 4 are housed within the outer shell 2, an equal number of through openings 8 are provided so that each bag is joined to the inner surface 6 of the outer shell 2 at the outer surface 12 thereof along a joining path 14 surrounding the inner edge 10 of the respective opening 8. In this way, multiple access ports can be created by piercing the sealed bags open at the respective through openings 8. This allows providing multiple fluid products within the same outer shell, for instance fluid products intended to be mixed only outside of the outer shell 2.

With reference to FIG. 3, as well as FIGS. 3A-3C, the joining path 14 may be provided in a variety of different solutions. The joining path 14 may feature a circular, continuous joining line or bead 16 (FIG. 3), or as a discontinuous or intermittent circular joining line or bead 16A (FIG. 3A) following a similar circular path as the joining line or bead 16.

Alternatively, the joining path 14 may feature a continuous polygonal joining line or bead 16B (FIG. 3B)—here, by way of example, represented as having a quadrilateral or square pattern, although it is to be understood that any polygonal shape can be used, or a discontinuous or intermittent polygonal joining line or bead 16C (FIG. 3C)—again, by way of example, represented as having a quadrilateral or square pattern, although it is to be understood that any polygonal shape can be used.

Joining is preferably provided by means of gluing, so that the joining line or bead follows the desired joining path 14 around the opening 8, and the glue is dispensed according to the continuous or intermittent pattern described above.

With reference to FIGS. 1 and 2, the outer shell 2 may be manufactured starting from a sheet or board made of the cellulose-based materials referred to in the foregoing folded and glued together in a carton-like shape including a top fin 18. The top fin 18 may itself provide additional anchoring for the bag 4 in addition to the joining line or bead(s) 16, whereby a portion of the sealed flexible bag 4 containing the fluid/liquid product L is sandwiched (and fixed) between opposite joined tabs making up the fin 18. Alternatively (FIG. 2), the fin 18 may be formed without sandwiching the bag 4 therebetween, hence relying on the joining at the path 14 for securing the bag 4 to the outer shell 2.

In some embodiments (FIGS. 5 and 8A, 8B), the outer shell 2 may feature a two-piece construction including an upper shell portion 2A and a bottom portion 2B fitted into the upper shell portion 2A and possibly provided with a recessed shape (i.e. a bow shape) to exhibit some degree of radial stiffness to help maintaining the shape of the outer shell 2.

With reference to FIG. 5, in some embodiments the upper shell portion 2A is cylindrical (with a generic elliptical cross-section) and the bottom portion 2B is bow shaped and inwardly recessed, whereby it is mainly concave on the outer side.

With reference to FIGS. 8A, 8B, in other embodiments the upper shell portion is prismatic or polyhedral and the bottom portion is again bow shaped to provide some degree of stiffness to the overall shape of the shell 2, only it is convex (flat) on the outer side. Note that the embodiments of FIGS. 8A, 8B can be practiced as a single piece construction, just like conventional double lid cardboard boxes.

In all of the embodiments herein, the outer shell 2 may be provided with an additional rim 20 (FIGS. 1, 4) at the opening 8, so to increase the wall thickness at the opening 18 itself.

The rim 20 is made of a cellulose-based material, preferably the same as the outer shell and is joined thereto by gluing, or by other material specific bonding technologies (e.g. water sealing Polypaper® when the rim is made of Polypaper®, which is disclosed in WO 2016/207849 A1).

The outer shell 2 may also be provided with a handle 22, preferably as part of a wrapping band enclosing the outer walls of the outer shell 2 and joined at the very handle 22.

With reference to FIG. 5A, the rim 22 may be integrally formed with the outer shell 2, while in other embodiments—see FIG. 5B—the opening 8 may be provided at a bulged socket 24 including a first, bulging, portion 26 sticking out of the outer shell 2, and a second, recessed (socket) portion 28 at the bottom of which the opening 8 is provided. Here the joining path 14 preferably extends at the bottom of the recessed portion 28.

In yet other embodiments, such as those depicted in FIG. 8B, the rim 22 may be provided as a separate member made of a cellulose-based material, possibly as the outer shell 2, but it is fixed to the shell 2 at the inner surface 6 thereof. To this end, the rim 22 may be conveniently formed with a flange as an abutment member at the inner edge 10 of the opening 8. Note that, while this arrangement is shown as applied to the embodiment of FIG. 8B, it is to be understood that it is applicable to each and every single embodiment disclosed herein.

With reference to FIGS. 6A, 6B, a first embodiment of an access port member 30 intended to be used with the container 1 according to the invention is shown therein.

The access port member 30 is configured to pierce the sealed flexible bag 4 open at the through opening 8, so to enable transfer of fluid to and from the bag 4 through the opening 8.

The access port member 30 comprises a neck portion 32 and a piercing portion 34, all traversed by a longitudinal through channel 36 extending along a longitudinal axis h30 of the access port member 30 and having a first section 36A (with a first cross section) at the piercing portion 34 and partly at the neck portion 32, a second section 36B (with a tapering cross section) and a third section 36C (with a second cross section, larger than the first cross section), both at the neck portion 32.

The piercing portion 34 includes a slanted tip 38, and preferably a plurality of radial through holes or eyelets 40. The slanted tip 38 may additionally be combined with, or replaced by, a serrated edge at a nose end thereof.

The neck portion 32, on its hand, includes a tapered portion 42 adjacent the piercing portion 34 at a shoulder 43, whereby the diameter of the tapered portion 42 at the shoulder 43 is larger than the (constant) diameter of the piercing portion 34. The tapered portion 42 may conveniently include a thread or a surface sculpturing T42 to increase the contact area at the through opening 8. The diameter of the tapered portion 42 increases away from the piercing portion 34.

The neck portion 32 also includes a terminal portion 44 adjacent the tapered portion 42, preferably at a flange 46 which defines a shoulder 47 at the tapered portion 42. The (constant) diameter of the terminal portion 44 may be coincident, larger, or smaller than the diameter of the tapered portion 42 at the flange 46, subject—of course—to it being larger than the inner diameter of the channel 36 at the terminal portion 44 itself.

A first sealing member, preferably an annular sealing member (e.g. an O-ring type seal) 48 is provided at the shoulder 43, while a second sealing member 50, again preferably an annular sealing member (e.g. an O-ring type seal), is provided at the shoulder 47.

Similarly to the portion 42, the terminal portion 44 may be provided with an outer thread T44 which is intended to receive a cap 52 with a matching inner thread T52, or else a functional attachment such as a pump or a spray pump 70 (see also FIG. 7B), whereby a cannula 72 of the spray pump 70 may be routed through the channel 36 once the bag 4 is pierced open.

With reference to FIG. 6B, a second embodiment of an access port member according to the invention is designated by reference number 60. The access port member 60 is essentially mushroom shaped and includes a head 62 as a neck portion and a sleeve 64 adjacent to the head 62 as a piercing portion. The sleeve 64 preferably features an outer thread or surface sculpturing T64 to increase the contact area at the opening 8, and also preferably features a serrated edge 66 to assist with tearing the bag 4 open. The serrated edge may itself be provided on a slanted edge of the sleeve 64, and the serrated edge 66 may even be dispensed with, if needed, and replaced with a non-serrated slanted edge. A through channel 68 extends along a longitudinal axis h60 of the access port member 60.

The operation of the container 1 in combination with the access port members 30 and 60 will now be described.

The container 1 is intended to be marketed as a fully recyclable, pre-filled fluid product container with an easy-to-provide fluid port that may possibly function as an attachment for accessories such as the cap 52 or the spray pump 70.

The sale unit may comprise one or more containers 1 or else may comprise a kit including the container 1 (or multiple containers 1) and the access port member 30 or 60.

In use, the flexible bag 4 is pierced open by tearing the portion thereof facing outside through the opening 8 to enable a fluid transfer to and from the container 1. This can be done with whatever tearing tool (such as a blade, a stylet, a cannula) or, preferably, through the access port member 30 or 60.

When inserted through the opening 8 with the piercing portion 34 or 64 in leading position (and with the axis h30 or h60 roughly aligned with the axis h8), the latter tears the plastic layer making up the wall of the flexible bag 4 and pokes into the volume of the bag 4. The through channels 36, 68 provide the actual access port that enables fluid transfer to and from the bag 4, and the one or more sealing members possibly provided on the access port members ensure fluid tightness at the interface between the bag 4 and the access port members 30, 60.

The design of the sealing members 30, 60 may conveniently be matched to that of the opening 8: when the latter is provided with the rim 22 or as a simple opening in the wall thickness of the outer shell 2 the access port member 60 may provide a simple and effective access tool to the interior of the bag 4, with fluid tightness provided by the shoulder between the head 62 and the sleeve 64, possibly with the aid of a sealing member thereat. The access port member 30 may work just as fine, with the tapered section 42 increasing the interference condition with the opening 8 as the access port member is advanced through the opening 8. In both cases, the thread/surface sculpturing T42, T64 may increase the contact surface by threading or scoring the interior of the opening 8.

When the opening 8 is provided on the bulged socket 24, the use of the access port member 30 is preferable in that the tapered section 42 matches the shape of the socket portion 28 and both the sealing members 48 and 50 are accordingly in a position to ensure fluid tightness at the top and the bottom of the socket portion 28, as visible in FIG. 7B.

Once access to the interior of the bag 4 is achieved, the container 1 can be used just like any prior art container, i.e. by pouring or spraying the fluid product/liquid L—or even by replenishing the bag 4 with fresh fluid product L. the cap 52 may be used to seal close the container 1, and the same closure action can be achieved when mounting the spray pump 70 onto the terminal portion 52, as the spray pump acts both as a dispenser and a cap.

Once the bag 4 is empty, the container can be disposed of by removing the access port member 30 or 60, breaking the outer shell 2 open and removing the bag by severing the connection at the joining line 14. The outer shell 2 can be recycled in the paper recycling stream, or as organic or compostable material, being it cellulose based, while the plastic mono-material of the bag 4 can be disposed of as recyclable plastic.

In general, the following end-of-life disposal options are available with the container 1 in embodiments wherein the container 1 includes an outer shell 2 made of cellulose or a cellulose-based material, and the flexible bag 4 is made of a plastic material such as PP, bio-PP, PE, bio-PE PET, bio-PET, the outer shell 2 is disposed of and recycled as paper material, whilst the flexible bag is disposed of and recycled as plastic material;

in embodiments wherein the outer shell 2 is made of cellulose or a cellulose based material and the flexible bag 4 is made of compostable plastic materials (such as MATER-BI® or PLA), the outer shell is disposed of and recycled as paper material, and the flexible bag is disposed of and recycled as paper material as well, since the compostable fraction is low and can be handled within paper recycling processes in embodiments wherein the outer shell 2 is made of cellulose or cellulose based material and the flexible bag is made of compostable plastics such as MATER-BI® or PLA both the outer shell 2 and the bag 4 are disposed of as compost.

in embodiments wherein the outer shell 2 is made of cellulose or cellulose based material and the flexible bag is made of PVA, both the shell 2 and the bag 4 are disposed of and recycled as paper material.

In other words, all of the components of the container can be separated and recycled as individual, uniform material, items. This ensures an almost total extent of recycling as compared to prior art containers wherein, for instance, certain plastic parts (for instance the neck and the cap) are made with a higher grade polymer material—for performance reasons. Thanks to the invention, the "high performance" portions such as the access port members 30, 60 are completely separable and independent of the container, which can accordingly be manufactured with eco-sustainable, mild-performance, and highly recyclable materials thereby dispensing with the manufacturing of a neck and a cap for each container 1, with related cost savings.

Naturally, while the principle of the invention remains the same, the details of construction and the embodiments may widely vary with respect to what has been described and illustrated purely by way of example, without departing from the scope of the present invention.

The invention claimed is:

1. An eco-sustainable container for fluid products, comprising:
    an outer shell made of cellulose-based material and having an inner surface and at least one through opening having an inner edge,
    at least one sealed flexible bag of polymer material containing a fluid product, the at least one sealed flexible bag being housed within the outer shell and having an outer surface facing said inner surface of the outer shell,
    wherein a portion of the outer surface of the sealed flexible bag is joined to a portion of the inner surface of the outer shell along a joining path surrounding the inner edge of a corresponding through opening,
    wherein said portion of the outer surface is enclosed by said joining path and is configured to be pierced by an access port member when the access port member is inserted through said through opening of said outer shell,
    wherein the outer shell forms a bulged socket integral therewith and made of a same cellulose-based material, and
    wherein the bulged socket includes a bulged portion sticking out of and raised above an outer surface of a portion of the outer shell adjacent to the bulged socket, and a recessed portion inside the bulged portion, the recessed portion extending in an opposite direction as the bulged portion into an inside area of the eco-sustainable container and terminating at a bottom which is recessed below inner and outer surfaces of the portion of the outer shell adjacent to the bulged socket, the through opening being provided in the bottom of the bulged socket.

2. The eco-sustainable container of claim 1, wherein said outer shell is made of cellulose pulp.

3. The eco-sustainable container of claim 1, wherein said outer shell is free of plastic material.

4. The eco-sustainable container of claim 1, wherein said at least one sealed flexible bag is made of a single polymer mono-material layer.

5. The eco-sustainable container of claim 1, wherein said joining path comprises a continuous joining line or bead.

6. The eco-sustainable container of claim 1, wherein said joining path comprises an intermittent joining line or bead.

7. The eco-sustainable container of claim 5, wherein said joining line or bead is provided by gluing.

8. The eco-sustainable container of claim 5, wherein said joining path is circular or polygonal.

9. The access port member for enabling transfer of a fluid product contained in the at least one sealed flexible bag of the eco-sustainable container according to claim 1, the access port member comprising:
    a piercing portion configured for tearing open said at least one sealed flexible bag at the through opening of the outer shell,
    a neck portion adjacent to the piercing portion,
    a through channel extending through the piercing portion and the neck portion, the through channel configured to enable transfer of the fluid product to and from the at least one sealed flexible bag.

10. The access port member of claim 9, wherein said neck portion includes a thread or a surface sculpturing.

11. The access port member of claim 9, comprising at least one sealing member configured to provide a sealing action at the through opening.

12. The access port member of claim 9, wherein the neck portion comprises a terminal section including an outer thread configured for receiving a cap or a spray pump.

13. The access port member of claim 9, wherein the piercing portion comprises a slanted tip or a serrated edge.

14. The eco-sustainable container of claim 6, wherein said joining line or bead is provided by gluing.

* * * * *

UNITED STATES PATENT AND TRADEMARK OFFICE
CERTIFICATE OF CORRECTION

PATENT NO. : 12,065,298 B2  
APPLICATION NO. : 17/702994  
DATED : August 20, 2024  
INVENTOR(S) : Federico Corazza Page 1 of 1

It is certified that error appears in the above-identified patent and that said Letters Patent is hereby corrected as shown below:

On the Title Page

(71) Applicant address information should be listed as:
- Fameccanica.Data S.p.A., San Giovanni Teatino (Chieti), ITALY -

(72) Inventor address information should be listed as:
- Federico CORAZZA, San Giovanni Teatino (Chieti), ITALY -

Signed and Sealed this  
Twenty-fifth Day of March, 2025

Coke Morgan Stewart  
*Acting Director of the United States Patent and Trademark Office*